Patented Mar. 13, 1945

2,371,320

UNITED STATES PATENT OFFICE 2,371,320

PROCESS OF PREPARING A COFFEE SUBSTITUTE

Peter O. Scow, St. Paul, Minn.

No Drawing. Application January 4, 1943, Serial No. 471,255

3 Claims. (Cl. 99—72)

My invention relates to an improvement in coffee substitute, and the process of preparing the same, wherein it is desired to provide a beverage which has some similarity with coffee.

Various cereal drinks have previously been composed, which are designed to act as a substitute for coffee. Certain of these compositions include grains of various sorts, such as wheat, barley, rye, oats, corn meal, bran and the like, and some of the beverages include molasses as an ingredient. While it is my intention to use these materials, I also use additional ingredients which not only improve the flavor of the beverage, but act to make the flavor distributed more thoroughly and evenly through the mixture than has been possible before.

An object of the present invention is to provide a cereal beverage which includes an ingredient designed to act upon the membranes of the throat much in the manner of coffee. As a result my beverage has much the same effect as coffee while being consumed. This fact coupled with the fact that the taste of the beverage is not unlike that of coffee produces a very satisfactory result.

I have found that a certain type of bark when mixed with cereal such as bran in proper proportions will produce a certain astringent action on the membranes of the throat, much in the manner of coffee. While I have tried the barks of various trees for this purpose, I have found that the bark of the poplar tree is particularly desirable for this purpose, as it produces the desired astringent effect. I have also found that my beverage appears to have somewhat of a stimulating effect when consumed. It is therefore my belief that the ground poplar bark adds some ingredient similar to caffeine in its effect upon the person consuming the beverage.

It is an important feature of the present invention that during the process of making the product I add a certain amount of vinegar to the mixture after the remaining ingredients have been ground. This vinegar seems to act as a catalyst, or in some way to distribute the flavor of the various ingredients throughout the entire mass. It will be understood that my beverage is formed of a plurality of ingredients ground together and mixed and a binder is used to intimately associate the particles of material forming the composition before the grinding action takes place. The addition of the vinegar seems to not only add to the flavor by changing the flavor somewhat, but also seems to act upon the particles to blend the flavors of the different ingredients together and to make the flavor more available to pass into the liquid of the beverage being formed. While the exact action of the vinegar in the mixture is not known, it appears that its use has a very beneficial effect in allowing the flavor of the particles to pass into the liquid and it is therefore believed that the vinegar acts in the capacity of a catalyst in some chemical reaction which permits the flavor of the ingredients to be more readily extracted.

A feature of my invention lies in the manner in which my composition is formed. I have found it desirable to follow certain specific steps in the formation of my coffee substitute. I desire first to toast the bran and molasses together so that the flavor of the molasses penetrates the bran and so that the molasses adheres to the particles of bran. I then cool the toasted product and grind the same into small particles, as the particles of bran have been adhered together by the molasses during the toasting process.

After the grinding operation I mix the ground product with the proper proportion of poplar bark, and at this time add the desired quantity of vinegar. These ingredients are intimately mixed so as to thoroughly disperse the individual ingredients, and the product is then toasted until dry. The product is then ready to use, and a beverage may be formed by using the product in much the same manner as coffee.

These and other objects and novel features of my invention will be more clearly and fully set forth in the following specification and claims.

In the preparation of my cereal beverage or coffee substitute I prefer to use a cereal grain which is preferably bran, and poplar bark. These ingredients are mixed with molasses and vinegar to produce the desired product. The composition of my cereal beverage is substantially as follows:

Poplar bark
Bran
Molasses
Vinegar

While various other cereal grains may be used in place of the bran mentioned, it is felt that none of the other grains provide the same flavor as bran. The product is seemingly more similar to coffee when bran is used than when wheat, rye, barley or corn are used, either singly or in combination. If it is not necessary to simulate as closely as possible the taste of coffee, the bran may be substituted by one of the other grains.

The use of poplar bark as an ingredient appears to be most desirable. Various types of barks have been used without accomplishing many of the same results. While the chemical composition of the poplar bark is not known it appears that this particular bark has somewhat of a stimulating effect when used in the beverage, and for this reason my beverage will provide somewhat the same stimulant as coffee itself.

The molasses used in the coffee substitute acts as a binder for the particles and also adds flavor to the composition. During the toasting process the molasses permeates the particles of the ingredients and adds a pleasing flavor to the beverage. The molasses used is preferably the dark type of molasses, the flavor of which is somewhat stronger than the lighter colored molasses, although this fact is not essential to the composition.

The vinegar apparently acts as a catalyst to blend the flavor of the ingredients, although unlike a true catalyst the vinegar changes the flavor of the product to some extent. This ingredient seems to make the flavor of the ingredients more readily extractable during the beverage making process, and it is for this reason that I believe some chemical change takes place when the vinegar is added. Subsequent to the mixing of the ingredients with the vinegar the compound is toasted so as to remove the moisture from the composition, thereby destroying the vinegar as such. The vinegar used is preferably apple vinegar formed from apples or apple cider. This vinegar has the additional feature of adding to the slightly astringent taste of the product which has been found so popular in coffee.

While the proportions of the various ingredients may vary to some extent I have found that a very suitable beverage may be formed from a composition substantially as follows:

| | Parts |
|---|---|
| Poplar bark | 2 |
| Bran | 16 |
| Molasses | 1 |
| Vinegar | 1 |

In forming my coffee substitute I prefer first to intimately mix the bran and molasses and to toast these ingredients. The molasses has a tendency to adhere the particles of bran together and accordingly the mixture is cooled and ground. This mixture is then mixed with the poplar bark and the vinegar is then added. The poplar bark is ground very finely before the same is mixed with the bran and molasses product. This composition is thoroughly mixed and then toasted until dry. The composition is then in readiness for use. It is very desirable that in toasting the molasses in bran that a temperature be maintained which is below the burning point of the molasses. It is even more essential, however, that the drying process at the end of the process be kept at a temperature below the burning point of the poplar bark, as the burning of this bark distracts materially from the taste of the product.

I have found that my composition not only is pleasant to drink, but also simulates coffee very closely in its color and aroma. In order to be suitable for use a product used as a coffee substitute must give off a pleasant aroma when being cooked and also when being served. I have found that my composition gives off such a pleasant aroma and has an appearance which is almost identical to that of coffee. The beverage may be made in any way that coffee is made. In other words, the beverage may be made by percolation, by the drip method, through the use of a glass coffee maker, or by boiling.

In accordance with the patent statutes, I have described the principles of composition and preparation of my coffee substitute, and while I have endeavored to set forth the best embodiments thereof, I desire to have it understood that obvious changes may be made within the scope of the following claims without departing from the spirit of my invention.

I claim:

1. The process of preparing a cereal beverage which comprises mixing a cereal, poplar bark and molasses in the presence of vinegar, and toasting the composition until dry.

2. The process of preparing a cereal beverage which comprises mixing a cereal grain and molasses, grinding the product thus formed, mixing the ground product with poplar bark, adding vinegar, mixing this mixture thoroughly and toasting the product until dry.

3. The process of forming a coffee substitute which comprises mixing substantially sixteen parts of bran with one part of molasses, toasting this composition, cooling and grinding the composition, mixing the composition with substantially two parts of poplar bark and one part of vinegar, mixing this product thoroughly and toasting the same until dry.

PETER O. SCOW.